(12) United States Patent
Matsuura

(10) Patent No.: US 8,714,221 B2
(45) Date of Patent: May 6, 2014

(54) PNEUMATIC TIRE

(75) Inventor: Shinichi Matsuura, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 13/422,267

(22) Filed: Mar. 16, 2012

(65) Prior Publication Data
US 2012/0325389 A1 Dec. 27, 2012

(30) Foreign Application Priority Data

Jun. 27, 2011 (JP) .................... 2011-141322

(51) Int. Cl.
*B60C 15/00* (2006.01)
*B60C 15/06* (2006.01)

(52) U.S. Cl.
USPC .......................... 152/539; 152/541

(58) Field of Classification Search
USPC .......... 152/539, 541, 546, 540, 542–545, 547
IPC ............................................. B60C 15/00,15/16
See application file for complete search history.

(56) References Cited

U.S. PATENT DOCUMENTS

| | | |
|---|---|---|
| 4,513,802 A | 4/1985 | Togashi et al. |
| 4,884,610 A | 12/1989 | Saito |
| 5,117,888 A | 6/1992 | Shimizu |
| 5,698,051 A * | 12/1997 | Tanaka .......................... 152/531 |
| 7,320,350 B2 * | 1/2008 | Wright ........................... 152/539 |
| 2006/0130953 A1 * | 6/2006 | Poling ........................... 152/540 |
| 2007/0029022 A1 * | 2/2007 | Tanaka et al. .................. 152/541 |

FOREIGN PATENT DOCUMENTS

| | | | | |
|---|---|---|---|---|
| EP | 0738618 A1 | 10/1996 | | |
| JP | 64-12903 A | 1/1989 | | |
| JP | 10181317 A | * 7/1998 | ............. | B60C 15/06 |
| JP | 2000-94914 A | 4/2000 | | |
| JP | 2000-289408 A | 10/2000 | | |
| JP | 2001130230 A | * 5/2001 | ............. | B60C 15/00 |
| JP | 2009-126262 A | 6/2009 | | |

OTHER PUBLICATIONS

Machine Translation: JP10-181317; Osaki, Michio; (No Date).*
Machine Translation: JP2001-130230; Takao, Masakazu; (No Date).*
Extended European Search Report, dated Oct. 18, 2012, for European Application No. 12001118.4.

* cited by examiner

*Primary Examiner* — Justin Fischer
*Assistant Examiner* — Kendra Shin
(74) *Attorney, Agent, or Firm* — Birch, Stewart, Kolasch & Birch, LLP

(57) ABSTRACT

A pneumatic tire 2 includes a tread 4, a pair of sidewalls 6, a pair of beads 8, and a carcass 10. In the pair of beads 8, each bead 8 includes a core 30 and a bead filler 32 extending outward from the core 30 in the radial direction. A minimal value θa of the inclination angle of the bead filler 32 is greater than or equal to 30 degrees, and is not greater than 44 degrees. A ratio Wa/Wb of a width Wa of the bead filler 32 to a width Wb of a bead portion is greater than or equal to 0.30, and is not greater than 0.45.

3 Claims, 4 Drawing Sheets

PNEUMATIC TIRE

This application claims priority on Patent Application No. 2011-141322 filed in JAPAN on Jun. 27, 2011. The entire contents of this Japanese Patent Application are hereby incorporated by reference.

BACKGROUND OF THE INVENTION

1. Field of the Invention

The present invention relates to pneumatic tires mounted to automobiles.

2. Description of the Related Art

Bead fillers for use in pneumatic tires are formed of highly hard crosslinked rubber. The bead fillers contribute to improvement of stiffness of tires. The tires having high stiffness are excellent in handling stability.

On the other hand, impact from road surfaces is likely to be conveyed to the tires having high stiffness. The tires having high stiffness provide poor ride comfort. Therefore, the width, the height, and the hardness of the crosslinked rubber of each bead filler of the tire, and the like are adjusted, so as to adjust handling stability and ride comfort provided by the tire.

JP2000-289408 discloses a tire in which the height up to which a carcass is turned up at both ends in the width direction of the carcass is reduced. This is one of techniques to improve ride comfort while maintaining handling stability.

In a tire having high stiffness, for example, the width of each bead filler is great. The increase of the width of the bead filler contributes to improvement of handling stability. On the other hand, the increase of the width of the bead filler may deteriorate ride comfort. Reduction of the width of the bead filler leads to improvement of ride comfort but may deteriorate handling stability. It is difficult to realize both improvement of handling stability and improvement of ride comfort.

An object of the present invention is to make available a tire which is excellent in both handling stability and ride comfort.

SUMMARY OF THE INVENTION

A pneumatic tire according to the present invention includes: a tread having an outer surface which forms a tread surface; a pair of sidewalls extending from ends, respectively, of the tread approximately inward in a radial direction; a pair of beads positioned inwardly from the pair of sidewalls, respectively, in the radial direction; and a carcass positioned under and along the tread and the pair of sidewalls, so as to extend on and between the pair of beads. In the pair of beads, each bead includes a core and a bead filler extending outward from the core in the radial direction. The bead filler has an inner surface on an axially inner side, and the inner surface forms a curved surface that extends so as to be inclined relative to the radial direction. The inner surface has an inclination angle gradually reduced from a radially inner side toward a center in the radial direction, and the inner surface has an inclination angle gradually increased from the center in the radial direction toward a radially outer side. A minimal value θa of the inclination angle of the bead filler is greater than or equal to 30 degrees, and is not greater than 44 degrees. A ratio Wa/Wb of a width Wa of the bead filler to a width Wb of a bead portion is greater than or equal to 0.30, and is not greater than 0.45.

Preferably, the minimal value θa of the inclination angle of the bead filler is greater than or equal to 40 degrees and is not greater than 42 degrees.

Preferably, the ratio Wa/Wb is greater than or equal to 0.40, and is not greater than 0.42.

The beads for use in the pneumatic tire according to the present invention can have a sufficient stiffness. Although the stiffness is sufficient, excess increase of the vertical stiffness constant of the tire is restrained. The tire is excellent in both handling stability and ride comfort.

DESCRIPTION OF THE PREFERRED EMBODIMENTS

The following will describe in detail the present invention based on preferred embodiments with reference to the accompanying drawing.

Figure 1:
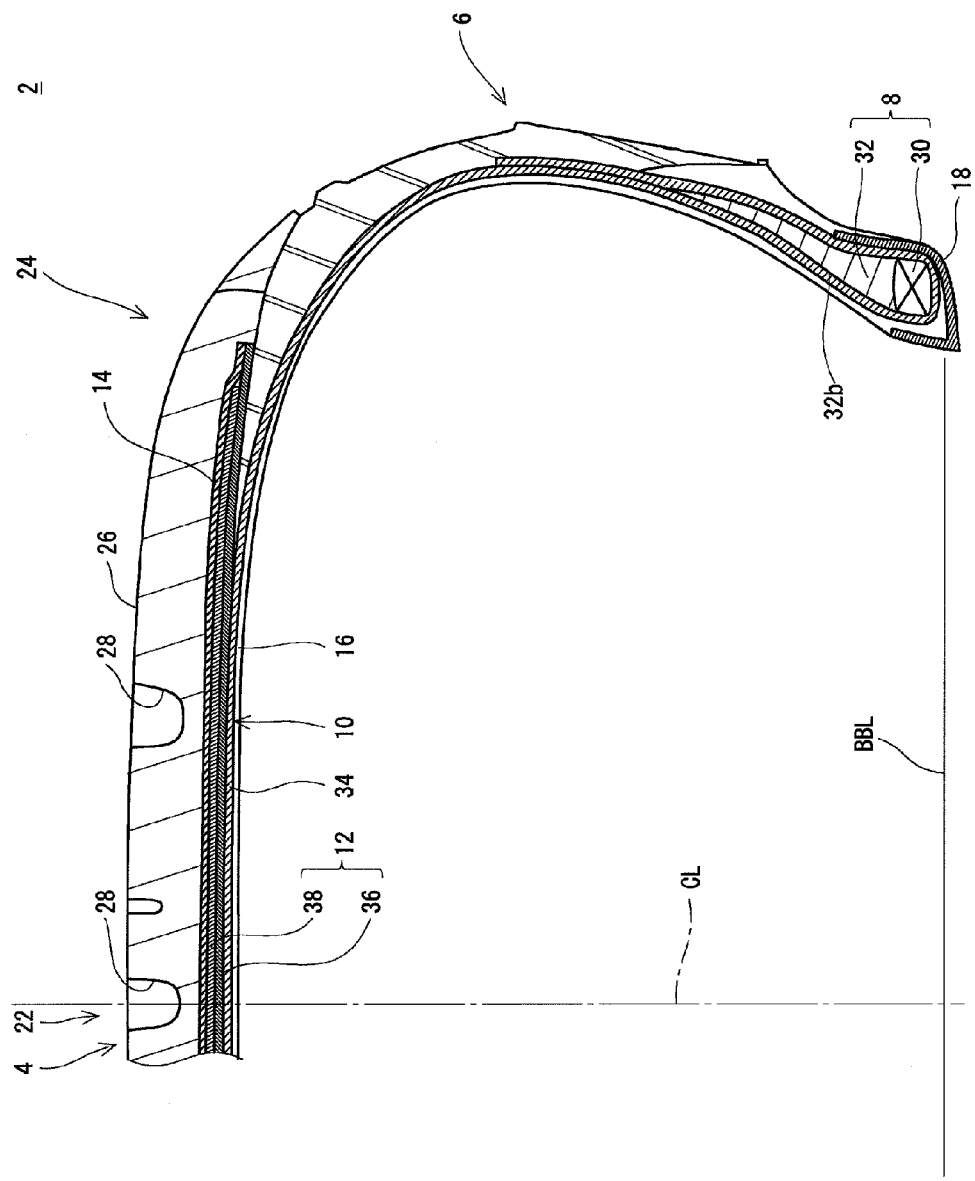
FIG. 1 is a cross-sectional view illustrating a portion of a pneumatic tire according to an embodiment of the present invention.

On a cross-section of a pneumatic tire 2 shown in FIG. 1, the upward/downward direction represents the radial direction, the leftward/rightward direction represents the axial direction, and the direction orthogonal to the surface of the sheet represents the circumferential direction. The alternate long and short dash line CL shown in FIG. 1 represents the equator plane of the tire 2. A solid line BBL represents a bead base line. The bead base line is a line that defines a diameter of a rim in which the tire 2 is mounted (see JATMA). The tire 2 has a shape which is almost bilaterally symmetric about the alternate long and short dash line CL. The tire 2 includes a tread 4, sidewalls 6, beads 8, a carcass 10, a belt 12, a band 14, an inner liner 16, and chafers 18. The tire 2 is of a tubeless type. The tire 2 is mounted to a passenger car. In the present embodiment, a region of the equator plane of the tire 2 is referred to as an equator region 22, and regions near the ends of the tread 4 are each referred to as a shoulder region 24.

The tread 4 is formed of a crosslinked rubber. The tread 4 has a shape projecting outward in the radial direction. The tread 4 includes a tread surface 26. The tread surface 26 can contact with a road surface. Grooves 28 are formed in the tread surface 26. A tread pattern is formed due to the grooves 28. The tread surface 26 may not have the grooves 28 formed therein.

The sidewalls 6 each extend, from the shoulder region 24 on a corresponding one of the ends of the tread, in the radially inward direction. The sidewalls 6 are formed of a crosslinked rubber. The sidewalls 6 absorb impact from a road surface due to their flexure. The sidewalls 6 prevent injury of the carcass 10.

The beads 8 are located inwardly from the sidewalls 6, respectively, in the radial direction. Each bead 8 includes a core 30, and a bead filler 32 extending from the core 30 outward in the radial direction. The core 30 is formed so as to be ring-shaped. The core 30 is formed so as to be repeatedly wound with a non-compressive wire in the circumferential direction. The non-compressive wire is, for example, a steel wire. The bead filler 32 is tapered outward in the radial direction. The bead filler 32 is formed of a highly hard crosslinked rubber. The hardness of the crosslinked rubber is, for example, greater than or equal to 80, and is not greater than 95.

The carcass 10 is formed as a carcass ply 34. The carcass ply 34 extends on and between the beads 8 located on both sides. The carcass ply 34 extends under and along the tread 4 and the sidewalls 6. The carcass ply 34 is turned up around each core 30 from the inner side to the outer side in the axial direction. The carcass 10 may be formed of two or more carcass plies 34.

The carcass ply 34 is formed of multiple cords aligned with each other, and a topping rubber, which is not shown. An absolute value of an angle of each cord relative to the equator plane usually ranges from 70 degrees to 90 degrees. In other words, the tire 2 including the carcass 10 has a radial structure. The tire 2 is superior, in steering performance and ride comport, to bias tires having a bias structure. The cords of the tire 2 are typically formed of an organic fiber. Examples of the preferable organic fiber include polyester fibers, nylon fibers, rayon fibers, polyethylene naphthalate fibers, and aramid fibers.

The belt 12 is located outwardly of the carcass 10 in the radial direction. The belt 12 is layered over the carcass 10. The belt 12 reinforces the carcass 10. The belt 12 includes an inner layer 36 and an outer layer 38. Each of the inner layer 36 and the outer layer 38 includes multiple cords aligned with each other and a topping rubber, which is not shown. Each cord is tilted relative to the equator plane. The absolute value of the tilt angle is greater than or equal to 10 degrees, and is not greater than 35 degrees. The direction in which each cord of the inner layer 36 is tilted is opposite to the direction in which each cord of the outer layer 38 is tilted. A preferable material of the cords is a steel. An organic fiber may be used for the cords.

The band 14 is located under the tread 4 in the radial direction. The band 14 covers the belt 12. The band 14 holds the belt 12. The band 14 includes a cord and a topping rubber. The cord extends substantially in the circumferential direction, and is helically wound. The band 14 has a so-called jointless structure. The belt 12 is held by the cord, so that lifting of the belt 12 is restrained. The cord is typically formed of an organic fiber. Examples of the preferable organic fiber include nylon fibers, polyester fibers, rayon fibers, polyethylene naphthalate fibers, and aramid fibers.

Figure 2:
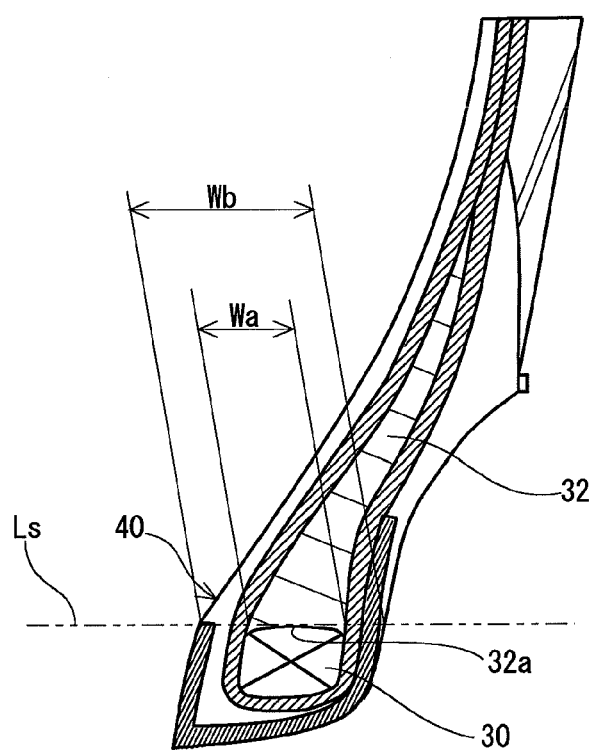
FIG. 2 is a partially enlarged view of the tire shown in FIG. 1.

A double-headed arrow Wa shown in FIG. 2 represents the width of each bead filler 32. A bottom portion 32a of the bead filler 32 contacts with the core 30. An alternate long and two short dashes line Ls represents a straight line that passes through the bottom portion 32a of the bead filler 32 and extends in the tire axial direction. The width Wa is measured on the alternate long and two short dashes line Ls. The width of the bead filler 32 is gradually reduced in the radially outward direction from the bottom portion 32a that contacts with the core 30. In the tire 2, the width Wa represents a maximal width of the bead filler 32. A double-headed arrow Wb represents the width of a bead portion 40 of the tire 2. The width Wb is also measured on the alternate long and two short dashes line Ls, similarly to the width Wa. The width Wb represents a width that is measured in the axial direction at a position at which the width Wa is measured. The width Wa and the width Wb are each measured in the tire axial direction on the cross-section of the tire 2 having been cut.

Figure 3:
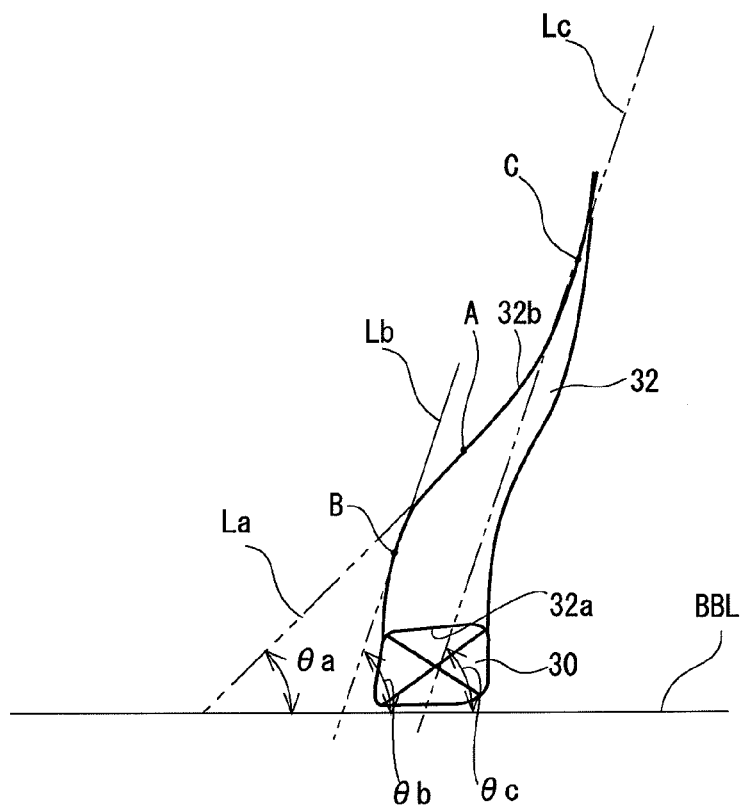
FIG. 3 illustrates a bead of the tire shown in FIG. 1.

FIG. 3 shows the core 30 and the bead filler 32 on the cross-section shown in FIG. 1. An inner surface 32b is formed on the axially inner side of the bead filler, so as to contact with the carcass 10. In FIG. 3, a point A is on the inner surface 32b, and is located at the midpoint between the outer side and the inner side of the inner surface 32b in the radial direction. A point B is on the inner surface 32b, and is located on the inner side of the inner surface 32b in the radial direction. A point C is on the inner surface 32b, and is located on the outer side of the inner surface 32b in the radial direction. An alternate long and two short dashes line La represents a line tangent to the inner surface 32b of the bead filler 32 in the axial direction. The alternate long and two short dashes line La represents the tangent line that passes through the point A on the inner surface 32b. Similarly, an alternate long and two short dashes line Lb represents the line that is tangent to the inner surface 32b and that passes through the point B, and an alternate long and two short dashes line Lc represents the line that is tangent to the inner surface 32b and that passes through the point C.

An angle $\theta a$ represents an angle between the bead base line BBL and the alternate long and two short dashes line La. Similarly, an angle $\theta b$ represents an angle between the bead base line BBL and the alternate long and two short dashes line Lb, and an angle $\theta c$ represents an angle between the bead base line BBL and the alternate long and two short dashes line Lc.

The inner surface 32b is a curved surface that extends so as to be inclined relative to the radial direction. The inclination of the inner surface 32b relative to the bead base line BBL is gradually reduced toward the point A from the inner side in the radial direction. The inclination of the inner surface 32b is gradually increased outward from the point A in the radial direction. Specifically, the angle $\theta b$ is greater than the angle $\theta a$, and the inclination of the inner surface 32b is gradually reduced from the point B toward the point A. The angle $\theta c$ is greater than the angle $\theta a$, and the inclination of the inner surface 32b relative to the bead base line BBL is gradually increased from the point A toward the point C. The angle $\theta a$ formed by the tangent line at the point A is smallest of angles between the bead base line BBL and each of the lines tangent to the inner surface 32b. The inclination of the inner surface 32b is minimal at the point A. The angle $\theta a$ represents a minimal value of an inclination angle of the bead filler 32.

In the tire 2, a ratio Wa/Wb of the width Wa of the bead filler 32 to the width Wb of the bead portion 40 is less than or equal to 0.45. In the tire 2 in which the ratio Wa/Wb is small, impact from a road surface is reduced. The tire 2 is excellent in ride comfort. In this viewpoint, the ratio Wa/Wb is preferably less than or equal to 0.42. On the other hand, each bead filler as described above contributes to improvement of stiffness of the tire 2. In this viewpoint, the ratio Wa/Wb is not less than 0.30. Preferably, the ratio Wa/Wb is not less than 0.40.

In the tire 2, the inclination angle $\theta a$ is less than or equal to 44 degrees. In the tire 2 that includes the bead fillers each having the inclination angle $\theta a$ reduced, a vertical stiffness constant is reduced. In the tire 2 having the vertical stiffness constant reduced, external force and impact which are applied in the radial direction are reduced. The tire 2 is excellent in impact absorbing property. The tire 2 is excellent in ride comfort. In this viewpoint, the inclination angle $\theta a$ is preferably less than or equal to 42 degrees. On the other hand, in the tire 2 in which the inclination angle $\theta a$ is increased, the vertical stiffness constant is increased. The tire 2 having the vertical stiffness constant increased has high stiffness, and is appropriate for receiving external force applied in the radial direction. In this viewpoint, the inclination angle $\theta a$ is not less than 30 degrees. Preferably, the inclination angle $\theta a$ is not less than 40 degrees.

In the tire 2, as described below, under a heavy load ranging from 6 kN to 8 kN, the vertical stiffness constant is reduced. In the tire 2 having a reduced vertical stiffness constant, a natural frequency is reduced. Conveyance of a vibration at a frequency that is 1.4 or more times as high as the natural frequency is restrained. In the tire 2 having the reduced natural frequency, a range of frequencies at which the conveyance of the vibration is restrained is enlarged. The tire 2 exerts enhanced vibration reducing effect when, in particular, a heavy load is applied to the tire 2 due to, for example, running on a raised road surface or a rough road.

Both the handling stability and the ride comfort provided by the tire 2 are improved by appropriately setting both the ratio Wa/Wb and the inclination of the inner surface 32b of the bead filler 32. The tire 2 is formed such that the handling stability and the ride comfort can be improved without modifying the hardness of the bead filler 32 and the height of the bead filler 32 in the radial direction. It is unnecessary to prepare multiple kinds of crosslinked rubbers to be used for the bead filler 32. It is unnecessary to increase the height of the bead filler 32 in the radial direction. Increase in weight due to the height of the bead filler being increased can be prevented.

In the present invention, the dimensions and angles of the tire 2 and each component of the tire are measured in a state where the tire 2 is assembled in a normal rim, and the tire 2 is filled with air so as to obtain a normal internal pressure, unless otherwise specified. During the measurement, no load is applied to the tire 2. In the description of the present invention, the normal rim represents a rim which is specified according to the standard with which the tire 2 complies. The "standard rim" in the JATMA standard, the "Design Rim" in the TRA standard, and the "Measuring Rim" in the ETRTO standard are included in the normal rim. In the description of the present invention, the normal internal pressure represents an internal pressure which is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. In the present invention, the rubber hardness is measured at 23° C. in compliance with the standard of "JIS-K 6253" by a type A durometer being pressed against the tire 2.

Hereinafter, effects of the present invention will become apparent according to examples. However, the present invention should not be restrictively construed based on the description of examples.

EXAMPLES

Example 1

A pneumatic tire, according to example 1, having the fundamental structure shown in FIG. 1, and specifications indicated in table 1 was obtained. The size of the tire was "225/50R17".

Example 2, Comparative Example 1, and Comparative Example 2

Tires were each obtained so as to have the same structure as that for example 1 except that the ratio Wa/Wb and the minimal value θa of the inclination angle were as indicated in table 1.

Examples 3 to 5, and Comparative Example 3

Tires were each obtained so as to have the same structure as that for example 1 except that the ratio Wa/Wb was as indicated in table 2.

Examples 6 to 10, and Comparative Example 4

Tires were each obtained so as to have the same structure as that for example 1 except that the minimal value θa of the inclination angle was as indicated in table 3.

[Measurement of Vertical Stiffness Constant]

Figure 4:
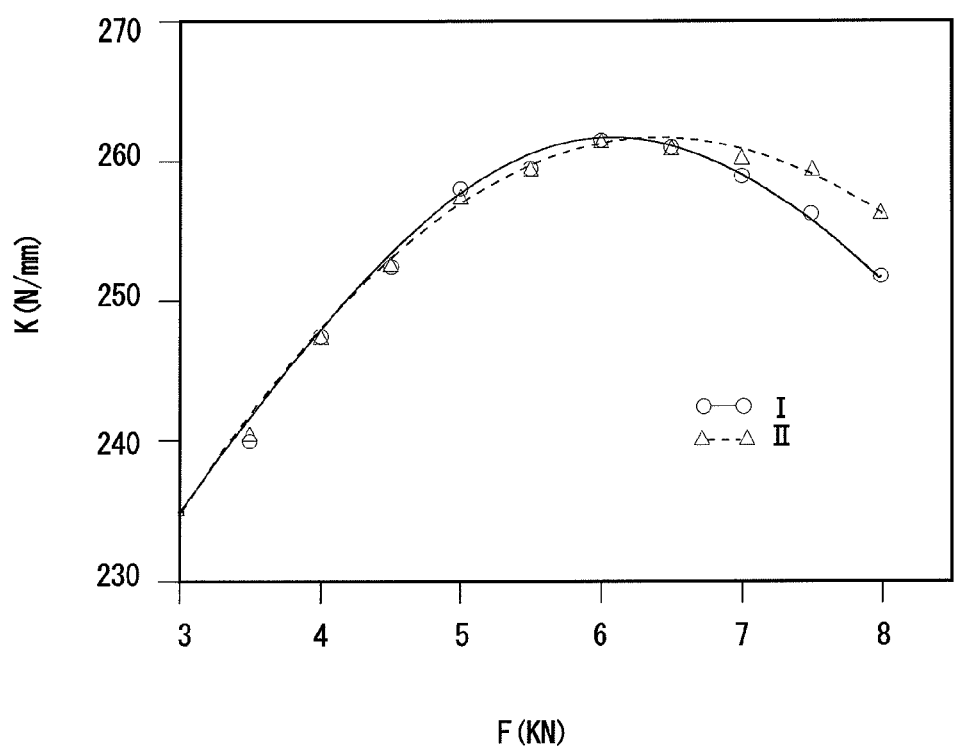
FIG. 4 illustrates test results of the tire of the present invention, and a tire of comparative example.

The vertical stiffness constant of the tire of each of Example 1, Example 2, Comparative example 1, and Comparative example 2 was measured. In table 1, the vertical stiffness constants measured when an external force of 8 kN was applied are indicated. FIG. 4 shows a graph representing a stiffness constant for each of Example 1 and Comparative example 1. A solid line I represents a measurement result for Example 1. A dashed line II represents a measurement result for Comparative example 1. As indicated in this graph, in the tire of Example 1, the vertical stiffness constant under a heavy load of 6 kN or more is reduced as compared, to in the tire of Comparative Example 1.

[Running Test]

Each of the tires indicated in table 1 to table 3 was mounted to a commercially available four-wheeled passenger car (FR layout car) having an engine displacement of 3500 cc, and the tire was filled with air such that an internal pressure became 230 kPa. This passenger car was caused to run on a circuit course, and a sensory evaluation by a driver was made.

Evaluation items of the sensory evaluation were handling stability and ride comfort. As the handling stability described herein, evaluation was made as to whether steering performance was favorable and whether wandering was less likely to occur.

The evaluation results are indicated below as indexes in table 1 to table 3. The indexes are represented on a ten-point scale. The greater a numerical value of the index is, the better the evaluation is.

TABLE 1

Results of measurement and evaluation

|  | Compa. example 1 | Example 1 | Example 2 | Compa. example 2 |
|---|---|---|---|---|
| Ratio Wa/Wb | 0.46 | 0.42 | 0.40 | 0.50 |
| Minimal value θa(°) | 45 | 42 | 38 | 48 |
| Vertical stiffness constant(N/mm) | 256 | 254 | 250 | 258 |
| Handling stability | 6 | 6 | 5 | 6 |
| Ride comfort | 6 | 7 | 7 | 5.5 |

TABLE 2

Evaluation results

|  | Example 4 | Example 3 | Example 5 | Compa. example 3 |
|---|---|---|---|---|
| Ratio Wa/Wb | 0.35 | 0.40 | 0.45 | 0.50 |
| Minimal value θa(°) | 42 | 42 | 42 | 42 |
| Handling stability | 5 | 5.5 | 6 | 6.5 |
| Ride comfort | 7 | 7 | 6.5 | 6 |

TABLE 3

Evaluation results

|  | Example 10 | Example 9 | Example 8 | Example 6 | Example 7 | Compa. example 4 |
|---|---|---|---|---|---|---|
| Ratio Wa/Wb | 0.42 | 0.42 | 0.42 | 0.42 | 0.42 | 0.42 |
| Minimal value θa (°) | 30 | 34 | 38 | 40 | 44 | 46 |

TABLE 3-continued

| | Evaluation results | | | | | |
|---|---|---|---|---|---|---|
| | Example 10 | Example 9 | Example 8 | Example 6 | Example 7 | Compa. example 4 |
| Handling stability | 5 | 5 | 5 | 5.5 | 6 | 6 |
| Ride comfort | 6.5 | 7 | 7 | 7 | 6.5 | 6.5 |

As indicated in table 1 to table 3, the tire according to the present invention is excellent in handling stability and ride comfort. The evaluation results clearly indicate that the present invention is superior.

The pneumatic tire according to the present invention can be mounted to various vehicles.

The foregoing description is in all aspects illustrative, and various modifications can be devised without departing from the essential features of the invention.

What is claimed is:

1. A pneumatic tire comprising: a tread having an outer surface which forms a tread surface; a pair of sidewalls extending from ends, respectively, of the tread approximately inward in a radial direction; a pair of beads positioned inwardly from the pair of sidewalls, respectively, in the radial direction; and a carcass positioned under and along the tread and the pair of sidewalls, so as to extend on and between the pair of beads, wherein in the pair of beads, each bead includes a core and a bead filler extending outward from the core in the radial direction, the bead filler has an inner surface on an axially inner side, and the inner surface forms a curved surface that extends so as to be inclined relative to the radial direction, the inner surface has an inclination angle gradually reduced from a radially inner side toward a center in the radial direction, and the inner surface has an inclination angle gradually increased from the center in the radial direction toward a radially outer side, a minimal value $\theta a$ of the inclination angle of the bead filler is greater than or equal to 30 degrees, and is not greater than 44 degrees, a ratio Wa/Wb of a width Wa of the bead filler to a width Wb of a bead portion is greater than or equal to 0.30, and is not greater than 0.45, the width Wa is greater than a width from an axially outside end of the bead filler to an axially outside end of the bead portion.

2. The pneumatic tire according to claim 1, wherein the minimal value $\theta a$ of the inclination angle of the bead filler is greater than or equal to 40 degrees, and is not greater than 42 degrees.

3. The pneumatic tire according to claim 1, wherein the ratio Wa/Wb is greater than or equal to 0.40, and is not greater than 0.42.

* * * * *